(12) United States Patent
Lecomte

(10) Patent No.: US 8,374,348 B2
(45) Date of Patent: Feb. 12, 2013

(54) DEVICE FOR SECURE TRANSMISSION RECORDING AND VISUALISATION OF AUDIOVISUAL PROGRAMMES

(75) Inventor: Daniel Lecomte, Paris (FR)

(73) Assignee: Nagra France (FR)

(*) Notice: Subject to any disclaimer, the term of this patent is extended or adjusted under 35 U.S.C. 154(b) by 1654 days.

(21) Appl. No.: 10/501,858

(22) PCT Filed: Jan. 15, 2003

(86) PCT No.: PCT/FR03/00122
§ 371 (c)(1),
(2), (4) Date: Oct. 25, 2004

(87) PCT Pub. No.: WO03/063445
PCT Pub. Date: Jul. 31, 2003

(65) Prior Publication Data
US 2005/0155073 A1    Jul. 14, 2005

(30) Foreign Application Priority Data

Jan. 18, 2002  (FR) ...................................... 02 00635

(51) Int. Cl.
*H04L 29/06* (2006.01)
(52) U.S. Cl. ........... 380/216; 713/156; 713/165; 726/26
(58) Field of Classification Search ................. 386/94; 713/156, 165; 726/26; 707/104.1; 380/216
See application file for complete search history.

(56) References Cited

U.S. PATENT DOCUMENTS

| 5,418,569 | A  | * | 5/1995  | Ando ...................... 375/240.04 |
| 5,712,976 | A  | * | 1/1998  | Falcon et al. ................ 725/115 |
| 5,892,825 | A  |   | 4/1999  | Feng et al. |
| 5,937,164 | A  |   | 8/1999  | Feng et al. |
| 6,529,550 | B2 | * | 3/2003  | Tahara et al. ................ 375/240 |
| 6,704,846 | B1 | * | 3/2004  | Wu et al. ...................... 711/150 |
| 6,829,301 | B1 | * | 12/2004 | Tinker et al. ............ 375/240.12 |
| 7,231,516 | B1 | * | 6/2007  | Sparrell et al. ............... 713/156 |
| 7,233,948 | B1 | * | 6/2007  | Shamoon et al. ................ 707/9 |
| 7,327,936 | B2 | * | 2/2008  | Lecomte ...................... 386/94 |
| 2002/0126755 | A1 | * | 9/2002 | Li et al. .................... 375/240.12 |
| 2004/0019608 | A1 | * | 1/2004 | Obrador .................... 707/104.1 |
| 2004/0083364 | A1 | * | 4/2004 | Andreaux et al. ........... 713/165 |
| 2007/0079381 | A1 | * | 4/2007 | Hartung et al. ................ 726/26 |

* cited by examiner

*Primary Examiner* — Brandon Hoffman
*Assistant Examiner* — Michael D Anderson
(74) *Attorney, Agent, or Firm* — DLA Piper LLP (US)

(57) ABSTRACT

A method of distributing video sequences according to a nominal flow format including a succession of frames each including at least one I block corresponding to a complete digital I image and at least one N block corresponding to differences between a digital N image and at least one other image including analyzing the flow of sequences to generate a first modified flow having a format of a nominal flow and having modified N blocks and a second flow of any format including digital information required to reconstruct the modified blocks; and transmitting the first and second flows from a server to destination equipment, and calculating on the destination equipment a synthesis of a flow in a nominal format as a function of the first flow and the second flow.

13 Claims, 2 Drawing Sheets

DEVICE FOR SECURE TRANSMISSION RECORDING AND VISUALISATION OF AUDIOVISUAL PROGRAMMES

RELATED APPLICATION

This is a §371 of International Application No. PCT/FR03/00122, with an international filing date of Jan. 15, 2003 (WO 03/063445, published Jul. 31, 2003), which is based on French Patent Application No. 02/00635, filed Jan. 18, 2002.

FIELD OF THE INVENTION

This invention pertains to the secure processing, broadcasting, recording and display of video data and television programs or more generally any multimedia program or sequence using a MPEG type nominal flow format, by authorized users and provides a secured system for the processing, broadcasting, delivery, recording, private copying and viewing of video or interactive multimedia programs and sequences.

BACKGROUND

The general problem is to provide a device capable of transmitting in a secure manner a set of high visual quality films in an MPEG type format directly to a television screen and/or to be recorded on the hard disk of a box connecting the remote transmission network to the television screen, while preserving the audiovisual quality but preventing any fraudulent use such as the possibility of making pirate copies of films or audiovisual programs recorded on the hard disk of the decoder box.

With the presently available solutions, it is possible to transmit films and audiovisual programs in digital form via broadcast networks of the airwaves, cable, satellite, etc. type or via DSL (Digital Subscriber Line) type telecommunication networks or LRL (local radio loop) networks or via DAB (Digital Audio Broadcasting) networks. Moreover, in order to prevent pirating of works broadcast in this manner, these works are often encrypted by various means well known to the expert in the field.

However, the principal disadvantage of presently available solutions such as in WO 00/165762 is that it is necessary to transmit not only the encrypted data to the users but also the decryption keys. Transmission of the decryption keys can be performed prior to, at the same time as or after transmission of the audiovisual programs. In order to increase the security and thus the protection of the audiovisual works against ill-intentioned use, the decryption keys as well as the decryption functions of the audiovisual decoders can comprise enhanced security means such as smart cards or other physical keys that can optionally be updated remotely.

Thus, the presently available solutions applied to a decoder box with the ability of local recording of audiovisual programs in digital form on a support of any type such as a hard disk or other type of memory provides an ill-intentioned user the possibility of making unauthorized copies of the programs recorded in this manner because at any given moment this user has with his digital decoder box associated or not with smart card systems all of the information, software programs and data enabling the complete decryption of the audiovisual programs. Precisely because of the fact that he possesses all of the data, the ill-intentioned user would have the possibility of making illegal copies without anybody becoming aware of this fraudulent copying when it is performed.

One solution would therefore consist of transmitting all or part of a digital audiovisual program solely on demand (on demand video services) via a broad-band telecommunication network of the DSL, cable or satellite type without authorizing the local recording of the audiovisual programs. The disadvantage there is completely different and stems from the performances of these network which do not make it possible to guarantee continuous flows of several megabits per second to each user as required by MPEG flows which require pass bands from several hundreds of kilobits to many megabits per second.

Under these conditions, one solution consists of separating the flow into two parts neither of which could be used by itself. Many patents have been filed in the context of this approach. We thus know from WO 09/908428 a method for the multiapplication processing of a localizable active terminal in which there is implemented at least one link with an identifiable program dedicated to the execution of an application, said program dictating its operating conditions to the terminal for the setting up of its functions. The terminal dialogues in a punctiform manner by using a link with the management center for the implementation, if necessary, of the inputs and outputs of the capacities of this center with the management center optionally becoming the slave of the terminal at the application level in relation to the incoming program. That invention also pertains to the method for the identification of the program and the terminal in operating mode. That method of the prior art divides the flow into a part used for identifying the user and a part that contains the actual program itself. In particular, the program is not unusable but merely made inaccessible by the first part.

In addition, EP 0778513 describes a method enabling prevention of illegal use of an information unit by adding to it a control information unit in order to verify the rights of the user. The system makes it possible to remain permanently informed as to which part of the information unit is used and by which user and thereby to be informed as to whether or not this user is in an illegal position. That method thus makes the data secure by adding additional information units which distort the initial information.

WO 00/49483 also provides methods and systems for creating a link between the users and an editor of digitized entities. The method comprises at least one of the following steps: the step of subdividing said digitized entity into two parts; the step of storing one part in memory in a server connected to a computer-based network; the step of transmitting the other part to at least one user who has available computer-based equipment; the step of connecting said computer-based equipment to said computer-based network; the step of establishing a functional link between said first part and said second part. Those methods and systems do not specify whether the part stored in memory on the server can be stored by the user, which would enable the user to pirate said digitized entity.

Lastly, with regard to this approach, the closest state of the art is found in the patents of HyperLOCK Technologies, the most pertinent of which is U.S. Pat. No. 5,937,164. That invention uses the solution comprised of separating the flow into two parts, the smaller one of which holds an information unit required for the use of the larger part. That patent nevertheless is not sufficient for resolving the identified problem. In fact, suppression of a part of the flow distorts the format of the flow which then cannot be recognized as a standard flow that can be run with general software applications. That method of the prior art requires both a specific software program at the server side for the separation of the two parts, and another specific software program enabling not only the reconstruction of the flow but also the acquisition of the principal flow and its management according to a format proprietary to the solution. That proprietary format is not the initial format of the flow prior to separation into two parts in this known solution.

U.S. Pat. No. 5,892,825 returns to the approach of the preceding patent but in a narrower framework because the flows are still encrypted; U.S. Pat. No. 6,035,329 is based on the same principle and pertains to a method enabling the reading of a CD-ROM or DVD-ROM disk contingent on the identification of the rights by the insertion of a smart card on which the information required for reading are stored. That method is still not adequate for our problem because it does not ensure that the modified flow is of the same format as the original flow. Finally, U.S. Pat. No. 6,185,306 pertains to a method for the transmission of encrypted data from a Web site to a requesting computer. That method, however, makes it possible for the user to have available at a given moment the tools required for copying the data.

SUMMARY OF THE INVENTION

This invention relates to a method of distributing video sequences according to a nominal flow format including a succession of frames each including at least one I block corresponding to a complete digital I image and at least one N block corresponding to differences between a digital N image and at least one other image including analyzing the flow of sequences to generate a first modified flow having a format of a nominal flow and having modified N blocks and a second flow of any format including digital information required to reconstruct the modified blocks; transmitting the first and second flows from a server to destination equipment, and calculating on the destination equipment a synthesis of a flow in a nominal format as a function of the first flow and the second flow.

This invention also relates to a system that creates a video flow according to the method, including at least one multimedia server containing original video sequences and a device for analyzing video flow originating from the server for generating the first and second flows.

This invention further relates to a system that manages a video flow according to the method, including a computer unit of a communication interface for receiving the video flow originating from a communication network or a physical support reader and equipped with at least one recorder that stores content of the first flow, a decoder including a display interface, means for communicating with the principal computer for receiving the first flow transmitted by the computer and communication means for receiving the second flow, and a means for recomposing original flow from the first and second flows.

This invention yet again relates to a system for transmitting a video flow according to the method, including an equipment unit that produces a video flow, at least one equipment unit that manages the video flow and at least one communication network between the production equipment and the management equipment unit(s).

BRIEF DESCRIPTION OF THE DRAWINGS

Better understanding of the invention will be obtained from the description below of a nonlimitative example of implementation with reference to the attached drawings in which.

DETAILED DESCRIPTION

Figure 1:
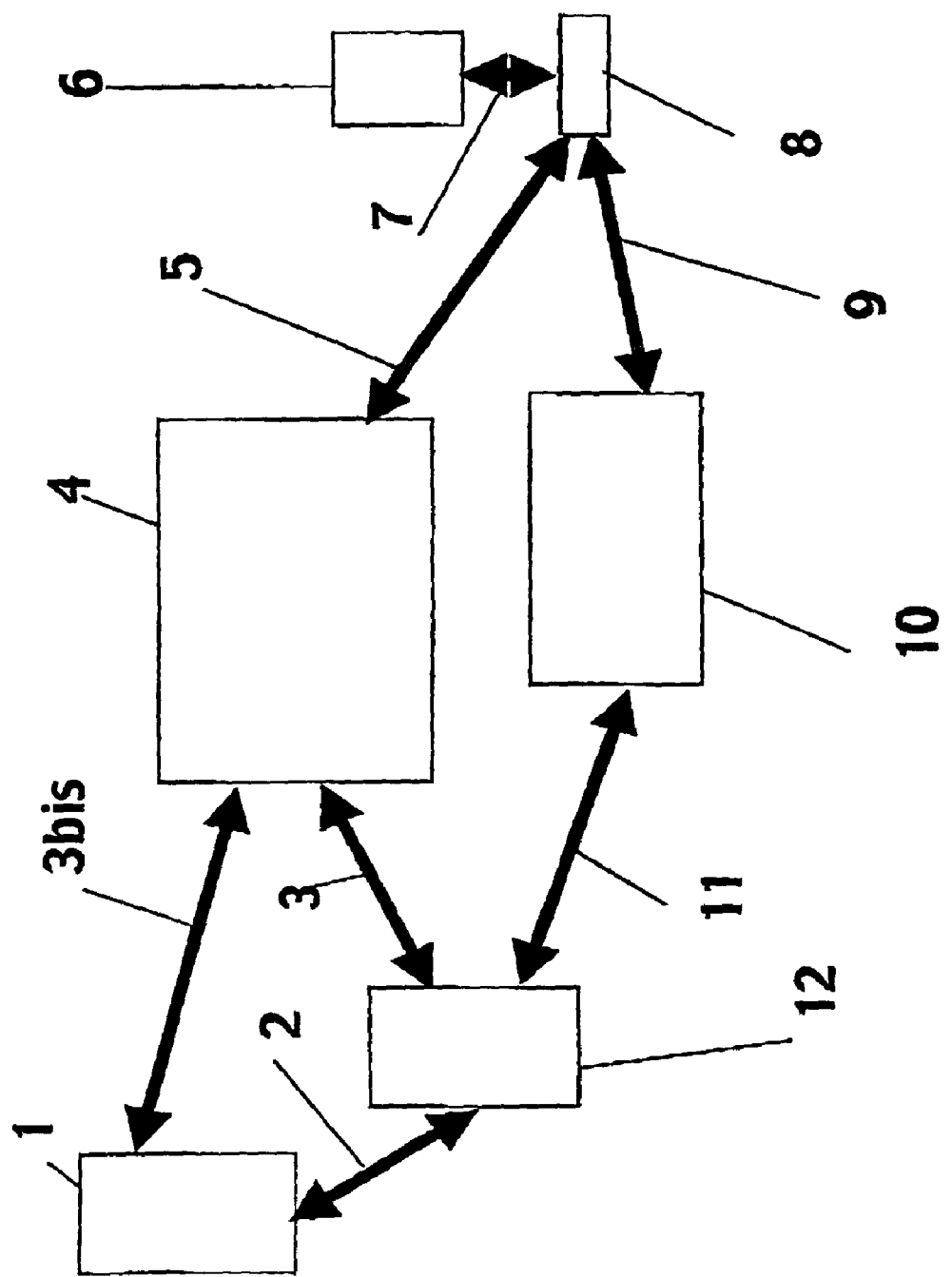
FIG. 1 describes the architecture of a system for the implementation of the method according to the invention.

This invention pertains in its broadest sense to a method for the distribution of video sequences according to a nominal flow format constituted by a succession of frames each comprising at least one I block corresponding to a complete digital I image and at least one N block corresponding to the differences between one digital image and at least one other image, characterized in that there is performed prior to the transmission to the client's equipment an analysis of the flow in order to generate a first modified flow presenting the format of a nominal flow and having modified N blocks and a second flow of any format comprising the digital information which can enable the reconstruction of the modified blocks, then of separately transmitting the two flows thereby generated from the server to the destination equipment, and in that there is calculated on the destination equipment a synthesis of a flow in the nominal format as a function of said first flow and said second flow.

The synthesis advantageously produces a flow rigorously identical to the original flow, i.e., the process is without loss.

According to one particular mode of implementation of this method, at least one N block corresponds to an N image calculated by movement compensation in relation to the preceding N or I image. The block and image are then referred to as P block and image (predicted).

According to another mode of implementation of this method, at least one N block corresponds to an N image calculated by movement compensation in relation to the preceding and following P or I images. The block and image are then referred to as B block and image (bidirectional).

If there are B and P images, an N block is necessarily of type B or type P.

According to one particular variant of this method, the nominal flow format is defined by the MPEG standard.

The analysis can advantageously determine the N images to be modified in order to obtain the first flow; these modifications can be: replace a P image by another P image from another flow, invert two P images of the same flow, invert a B image and a P image of the same flow.

In one particular implementation of this method, the transmission of the first flow is implemented via a material support distributed physically such as a CD-ROM, a DVD or a hard disk.

In another implementation of this method, the transmission of the first flow is implemented via a broad-band network (cable, satellite, optical fiber, airwaves) via a DSL (Digital Subscriber Line) type network, via a DAB network or via a local radio loop network (LRL).

According to the implementation of this method, the transmission of the second flow is implemented via a cable network, via a switched telephonic network (analog or digital), via a mobile telephonic network using the GSM, GPRS or UMTS standards, via an LRL network (local radio loop) or via a DSL network.

According to one particular variant of this method, transmission of the second flow is implemented via a broad-band network of the same type as the network used for the first flow, or via the same network.

Transmission of one or both of the two flows is advantageously encrypted.

One or both of the flows can advantageously be watermarked.

According to one particular mode of implementation, reconstruction is contingent on a payment.

Reconstruction can also be authorized by consultation of a private copy demanded by the client.

The invention moreover pertains to an equipment unit for the creation of a video flow for the implementation of this method comprising at least one multimedia server containing the original video sequences and characterized in that it comprises a device for the analysis of the video flow stemming from the server in order to generate the two flows.

This equipment advantageously comprises a memory for recording a "private copy" marker indicating for each sequence the rights of each user: private copy that can be watched an unlimited number of times, private copy that can be watched a limited number of times and specification of that number, and private copying prohibited.

The invention moreover pertains to equipment for the management of a video flow for the purpose of implementing this method comprising a standard flow decoder, at least one recording interface (hard disk, flash memory, etc.) intended to store the contents of the first flow and/or a disk reader (CD, DVD, etc.) and at least one display interface (standard screen, wireless screen, video projector), characterized in that it comprises a means for the recomposition of the original flow from the two flows.

According to one particular mode of implementation, the means is a software application installed in the equipment.

According to another mode of implementation, the means is a fixed electronic device.

According to another mode of implementation, the means is a portable or mobile electronic device.

According to a mode of implementation in which the equipment is installed on a computer, the means uses a resource specific to the product (card) so as to prevent the copying of the temporary information of the second flow onto a permanent support.

The recording interface advantageously also stores a "private copy" marker in relation to the first flow indicating for this sequence the rights of the user: private copy that can be viewed an unlimited number of times, private copy that can be watched a limited number of times and specification of that number, private copying prohibited.

The equipment advantageously comprises a smart-card reader for identifying the user.

The equipment advantageously comprises a smart-card reader, the smart card containing the software applications and/or the data of said second flow.

One variant of implementation consists of implementing the client equipment in the form of two means interconnected by a physical link or a remote link (Bluetooth, AirPort, WiFi, infrared, etc.). According to this variant, the equipment for the management of a video flow comprises a first means constituted by a personal computer of a communication interface for receiving a video flow originating from a communication network or a physical support reader, and equipped with at least one recording means [hard disk] intended to store the content of said first flow, and a second means constituted by a decoder comprising a display interface, means for communication with said principal computer for receiving said first flow transmitted by the computer and communication means for receiving said second flow, as well as a means for the recomposition of the original flow from the two flows.

According to a first mode of implementation, the means for the recomposition of the flow is a software application installed solely on the decoder.

According to a second mode of implementation, the means for the recomposition of the flow is an electronic device installed solely on the decoder.

Lastly, the invention pertains to a system for the transmission of a video flow, characterized in that it comprises an equipment unit for production of a video flow, at least one equipment unit for management of a video flow and at least one communication network between the production equipment and the management equipment.

The invention pertains to a flow of data of a nominal format especially but not exclusively a flow of the MPEG type. The format of the audiovisual flow used must have the following characteristics:

this format must break down the data into frames, each frame comprising a complete digital I image and at least one P image calculated by coding the differences (movement compensation) between this image and the preceding I or P image;

optionally, each frame comprises at least one B image calculated by coding the differences (movement compensation) between this image and the preceding and following I and/or P images.

In the description below the example pertains to an MPEG flow; this does not however constitute a limitation on the scope of protection.

The general principle of a method to ensure the security of a video flow is presented below. The objective is to authorize on demand video and upon demand via all of these broadcasting networks and the local recording in the user's digital decoder box. The solution consists of permanently preserving outside of the user's habitation, in fact in the broadcasting and transmission network, a part of the recorded audiovisual program, this part being essential for viewing the audiovisual program on a television or monitor screen, but being of very small volume in relation to the total volume of the digital audiovisual program recorded by the user. The missing part will be transmitted via the broadcasting and transmission network at the time of viewing said digital audiovisual program prerecorded by the user.

The greatest part of the MPEG audiovisual flow will thus be transmitted via a conventional broadcast network while the missing part will be sent on demand via a narrow-band telecommunication network such as conventional telephone networks or using a small part of a DSL or LRL type network, or using a subset of the shared pass band on a cable network.

FIG. 1 in the attached drawings is a diagram of the principle of a distribution system according to the present invention.

Figure 2:
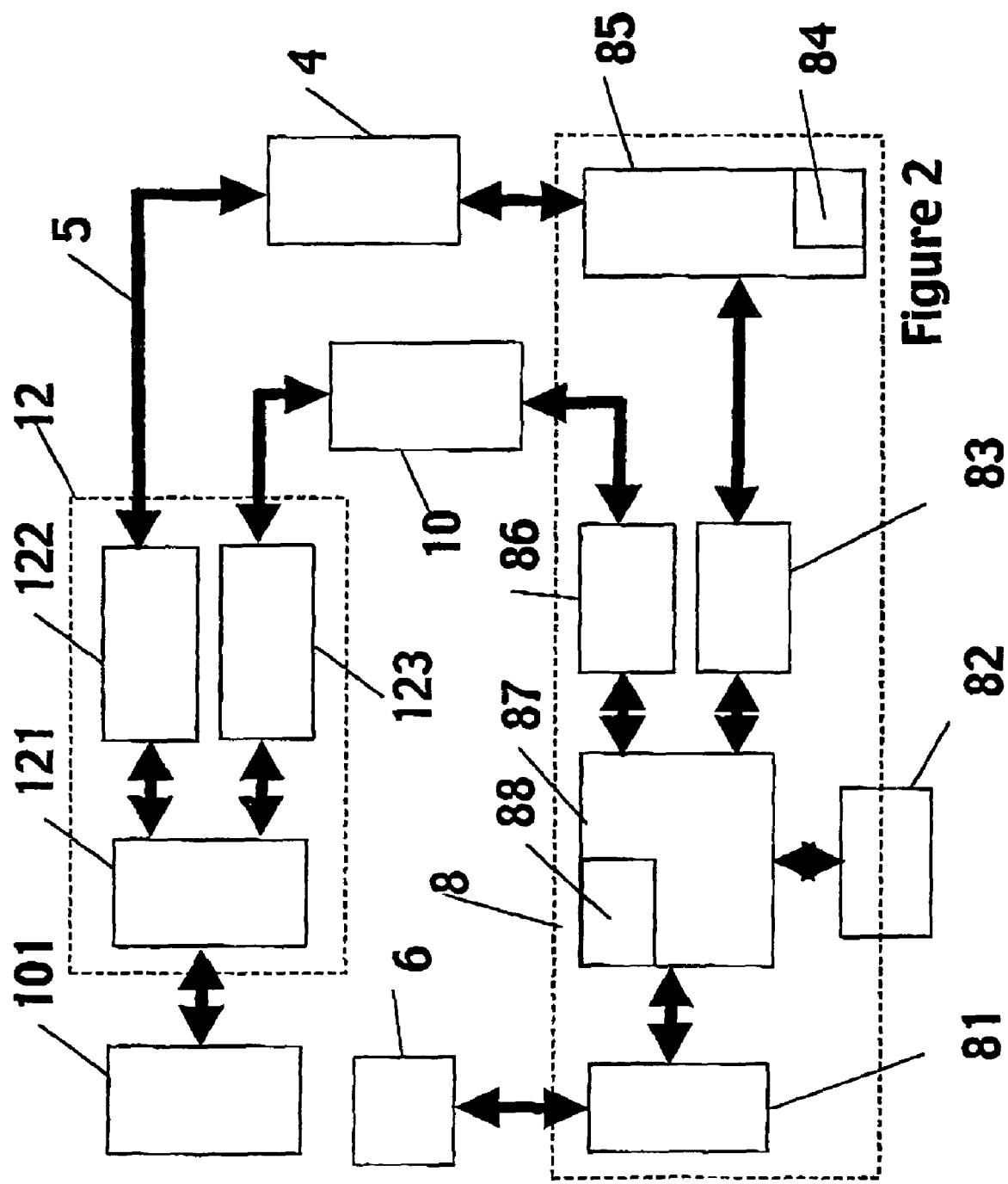
FIG. 2 represents one particular mode of implementation of the system for the analysis and synthesis of MPEG type flow in accordance with the invention.

FIG. 2 represents a particular mode of implementation of the system for the analysis and synthesis of MPEG flow according to the invention.

In FIG. 1, the video interface (8) setup is adapted for connecting at least one display device, e.g., a monitor, a video projector or a television screen type device (6) to at least one broad-band transmission and broadcasting network (4) interface and to at least one telecommunication network interface (10). According to the invention, this setup is composed of a module (8) comprising principally a suitable processing unit for processing, in particular decoding and unscrambling, all MPEG type video flows according to a preloaded decoding and unscrambling software program in real or delayed time, of storing it, recording it and/or transmitting it on a telecommunications network, as well as a screen interface (7) and an interface for connection to a local or extended area network (5) and/or (9). The broad-band transmission and broadcasting network (4) and the telecommunication network (10) can be a single network.

The hard disk of the module (8) can be used as a buffer memory for momentarily storing at least a part of the video program or sequence to be displayed in the case of delayed display or of limitation in the pass band of the transmission network. Viewing can be delayed or differed upon request of the user or the portal (12).

As shown in FIG. 1, the connection interface (5) is linked to a broad-band transmission and broadcasting network (4) such as a modem, a satellite modem, a cable modem, an optical fiber line or a radio or infrared interface for wireless communication.

It is by means of this conventional video broadcasting link that the contents of audiovisual programs such as films will be transmitted. Nevertheless, in order to prevent the possibility of pirate copies, prior to transmitting the audiovisual content from the server (1) or portal (12) it is provided to hold back a small part of the audiovisual content in the portal (12).

In the case of viewing an audiovisual program in real time, this small part of the audiovisual content preserved in the portal (12) will also be sent to the module (8) via the telecommunication network (10).

Since the successive images of a video sequence contain a large number of identical visual elements (as with cinema, an image resembles the preceding image), MPEG only records the elements that differ from the original image. Thus, there is preserved an entire reference image and, for the successive images, only the modifications are retained.

Thus, the MPEG compression commences initially by breaking down the image into different square matrices comprising multiple points or pixels, each having its own colorimetric value. A calculation makes it possible to obtain an average value for each matrix within which each point is maintained in embedded form. This process generates a pixellation and the appearance of uniform tints where tint nuances previously existed. The second step of the MPEG compression consists of preserving from one image to another only the changing elements.

In order to obtain animated images, the principle consists of capturing several images in time, while the intermediary images are calculated from these images. Analysis of the complete reference images (referred to as I images=Intraframe images) enables prediction of the intermediary P images (Predicted frames). Then, the B images (Bidirectional frames) are intercalated between the reference images and the predicted images.

Three major types of images are thus defined in order to respond to the contradictory demands of a possibility of direct access and a high compression efficacy.

1. The Intra coding images (I images) are coded without reference to the other images. They provide the access points to the coded sequence in which the decoding can commence but are coded with a moderate compression rate.

2. The Prediction coded images (P images) have a more effective coding using a movement-compensated prediction after a prior intra (I) or predicted (P) image, and are generally used as reference for a future prediction.

3. The images coded by Bidirectional prediction (B images) provide the highest compression rate, but require for movement compensation a prior reference image and a future reference image. The images coded by bidirectional prediction are never used as prediction reference.

The organization of the three kinds of images in a sequence is very flexible: its selection is left to the coder and depends on the requirements of the application.

When it reads the binary train, a conventional MPEG decoder identifies the beginning of a coded image, then the type of image. In order to avoid any confusion between a standard decoder box (often referred to as a "Set Top Box" or STB), the standard MPEG decoder will be referred to as the "Reader" ("Player" or "Viewer") in the document below. This Reader can be implemented in hardware or software form. The MPEG reader decodes successively each macroblock of the image. The image is reconstructed when all of its macroblocks have been processed. In the case of an I image or a P image, it constitutes a reference image for the subsequent images and it is stored in the place of the oldest reference image. The images are thus available in digital form for post-processing and display, according to the application.

In the case of an MPEG type audiovisual program, it is provided to not transmit all of the B and/or P images originating from the server (1) or the portal (12) to the module (8). These B and/or P images being retained in the portal (12). To the contrary, in the place of the untransmitted B and/or P images, the device according to the invention intercalates false B and/or P images of the same type as the removed B and/or P images and retained in the portal (12) such that the standard MPEG Reader of the module (8) is not disturbed by these modifications that it will be unaware of and it will reconstitute as output an outgoing MPEG flow that will be incorrect from the visual point of view for a human being but correct from the MPEG format point of view.

The MPEG Reader of the box (8) is a standard MPEG Reader and has not been changed in any way or affected by the changes performed on the B and/or P images.

According to one particular mode of implementation, in order to increase the efficacy of the protection system it is preferable to not send the B and/or P images which are closest to and which follow the I images of the MPEG flow. For even greater efficacy, after analysis of their volume and their weight in octets or in bits, B and/or P images will be selected to not be transmitted but retained in the portal (12).

According to one particular mode of implementation, certain P and/or B images will be permuted among each other.

As shown in FIG. 1, the connection interface (9) is linked to an extended telecommunication network (10) directly or via a local network serving as access network and it is constituted, e.g., by a subscriber line interface (analog or digital telephonic network, DSL, LRL, GSM, GPRS, UMTS, etc.).

Thus, the audiovisual programs are broadcast in a conventional manner in multidiffusion mode ("broadcast") via the broad band transmission network (4) of the airwaves, cable, satellite, digital airwaves, DAB, DSL type, etc., from the server (1) directly via the link (3 bis) or via the portal (12) via the link (2) and (3) to the decoder module (8) by means of the link (5). Each audiovisual program broadcast in this manner can be optionally encrypted and in accordance with the invention, the MPEG flow contains modifications at the level of the B and/or P images as described above. As a function of the parameters selected by the user or of the information transmitted by the broadcast server, certain audiovisual programs modified in this manner and incomplete are recorded on the hard disk of the box (8).

When the user wants to watch an audiovisual program recorded in this manner on the hard disk of his box (8), he issues the command in the conventional manner via the remote control linked to his box (8) which then connects automatically to the portal (12) via the link (9) of the local network or direct access type and via the telecommunication network (10) which is itself linked to the portal (12) via the link (11). During the entire displaying of the audiovisual program, the links (9) and (11) remain connected and allow the box (8) to receive the missing B and/or P images as well as the algorithms, functions and parameters for restoring the order of the B and/or P images. The B and/or P images transmitted in this manner are never recorded on the hard drive of the box (8) but are directly displayed on the display screen (6) via the link (7) after having been processed by the Reader of the box (8) from its local volatile memory. Once they have been processed and displayed, the B and/or P images having been transmitted by the portal (12) will be erased from the local volatile memory of the box (8).

According to a particular mode of implementation, the P and/or B images broadcast in this manner can be optionally encrypted by any existing or future encryption means. The same is true for the algorithms, functions and parameters for restoring the order of the B and/or P images.

Each time that the user wants to watch a program recorded on the hard disk of the box (8), the box (8) will connect automatically to the portal (12). The same is true when the user pauses, the transmission of the B and/or P images originating from the portal (12) will be interrupted until the restarting of the display, thus ensuring that not all of the information units of an audiovisual program will be found in the box (8) at a given moment and thereby preventing an ill-intentioned person from making pirate copies of these recordings.

According to a particular mode of implementation, the box (8) comprises a smart card reader which enables the portal (12) to authenticate the user owner of the box (8). If this is authorized, this function also allows the user to make private copies of the audiovisual programs recorded on the hard disk of his decoder box (8). In order to do this, if the user wants to make a private copy of an audiovisual program, the user does so in the conventional manner on a VCR via the link (7) that connects the box (8) to the display screen (6).

However, if the user wants to preserve a private copy on the hard disk of the box, the user will so inform the box (8) which will record the "private copy" information unit as well as the coordinates of the user which are on the smart card in a particular field (84) of this audiovisual program recorded on the hard drive (85) of the decoder box (8). Whenever the user subsequently wants to watch this private copy, the box (8) will connect automatically to the portal (12) and inform the box that the user wants to implement a reading of his private copy; in response, if the reading of the private copy is possible for this user who possesses this smart card linked to this box (8), the decoder box (8) will then receive the missing B and/or P images as well as all the other information enabling the display of the audiovisual program constituting the private copy.

According to another mode of implementation, if the user wants to preserve a private copy on the hard drive of the box, the user will so inform the server which will record the information unit "private copy" for this program and for this user authenticated by the smart card. Each time that the user wants to watch this private copy, the box (8) will then connect automatically to the portal (12) and will inform this portal that the user wants to implement a reading of the user's private copy; in response, if the reading of the private copy is possible for this user who possesses this smart card and for this program, the decoder box (8) will then receive the missing B and/or P images as well as all of the other information enabling the viewing of the audiovisual program constituting the private copy.

According to a particular mode of implementation, the so-called "private copy" could enable the user to watch this same audiovisual program in an unlimited manner or a number of times determined in advance by the service provider who authorized this private copy.

The invention also pertains to the physical box (8) used by the consumer to access the data. This physical box is located at the user's domicile. It provides a set of functionalities which manage the appropriate information to be presented according to the audience's selection and manages the connection and communication with the remote server.

According to a particular mode of implementation, the physical box (8) corresponding to the video interface setup is implemented as a fixed autonomous device with integrated hard disk.

According to another particular implementation, the video interface setup is implemented as an add-on card which would be installed in a PC-type computer and would be linked to at least one broad-band transmission and broadcasting network interface (4) and to at least one telecommunication network interface (10). This card would use the hard disk of the PC for recording the first flow, but would have its own calculator and its own volatile memory so as to not allow the ill-intentioned user of the PC the means to access the complementary information units such as the B and/or P images of the second flow.

According to the present invention, the video and multimedia servers (1) and/or (12) comprise the means for coding, transcoding and scrambling of video data, in particular the means for adding cryptographic and security information units at the beginning and all along the sequences.

It lastly should be noted that the invention degrades the MPEG flow from the visual point of view until no longer allowing recognition of the transmitted and displayed scenes without having access to the complementary data and characteristics, but completely reconstitutes the MPEG flow in the video interface setup without any loss.

Although the invention has focused most particularly on audiovisual data, it is understood that all interactive multimedia information and all interactive data can be processed by the setup and the system, MPEG type video data being the most elaborated. Better understanding of the invention will be obtained from the description below describing the physical basis of the invention and with reference to FIG. 2 of the attached drawings representing a preferred mode of implementation of this latter setup as a nonlimitative example of implementation particularly suitable for cable and satellite networks. The complete MPEG flow (101) is analyzed by the analysis device (121) of the portal (12) and will thus be separated into an MPEG type flow but whose B and/or P images will have been processed and sent via the output (122) of the portal to the broad band transmission and broadcasting network (4).

The other part of the modified MPEG flow will be stored in memory in the buffer memory (122) of the portal (12). For each MPEG flow broadcast in this manner, the portal (12) will store in a buffer memory (122) the modifications that were implemented in this MPEG flow by the analyzer (121) of the portal (12). It should be clarified that for the same incoming MPEG flow (101) the processing of the flow can be different for each user (18) and/or for each group of users (18). Thus, the buffer (123) of the portal (12) comprises a different memory zone for each user.

In the implemented examples, for a first user (18) each first P image of the MPEG flow which follows an I image was replaced by a random P image of the same type and same volume as the P image removed in this manner. It has been found that the degrading effects on the output flow are very intense.

For a second user (18) the nth P image that follows each I image of the MPEG flow was permuted by and with the first B image that follows this P image. It has been found that this permutation is very effective for MPEG type animated sequences compared to MPEG sequences having little animation.

We will now describe in detail the different steps for this first user.

The portal (121) selected the MPEG flow (101) that it must transmit to the user (18) to be watched on a delayed basis on his television screen (6). This user is linked to a digital cable broadcast network (4) offering video on demand (VOD), the network (10) is thus the same as the network (4). The analysis system (121) of the portal (12) will thus read the incoming MPEG flow (101) and each time that it detects an I image, it searches for the first P image that follows this I image so as to replace it with a random P image that it calculated. The new modified MPEG flow is then recorded in the output buffer (122) to be broadcast on the broadcast network (4) via the link (5). The P images removed from the incoming MPEG flow (101) are stored in the buffer memory (123) of the portal. In the implemented example, rather than substitute each P image that follows an I image, the analysis system (12) only takes one I image out of n in which n is a random number comprised between 1 and 7. When the analysis system (121) writes the substituted P image in the buffer memory (123), it also writes the number of the I image that precedes the thereby substituted P image. The analysis system (121) continues its analysis until the end of the incoming MPEG flow.

During this time and in a completely unsynchronized manner, the outgoing modified MPEG flow originating from the output buffer (122) of the portal (12) is broadcast via the broad band network (4) to one or more users (18).

Each decoder box (8) from FIG. 1 (that is essentially a user 18 in FIG. 2) that wants to record this MPEG flow modified in this manner can then read this MPEG flow and record it on its hard disk (85). This recording initiative is left to the decoder box (8) under the control of the portal (12). In order to perform this, the analysis system (121) had written at the beginning of the MPEG flow an information unit of supplementary data that specified the addresses of this modified MPEG flow. The addressees can thus be a particular and single addressee/user (18), a group of addressees/users (18) or the totality of the decoder boxes (8) from FIG. 1 linked to the network (4).

The phase described above corresponds to the first phase of preparation of the MPEG flow by the portal (12), its transmission via the broad band network (4) and its recording in a decoder box (8) from FIG. 1. This decoder can then display this MPEG flow recorded on its hard disk (85). In order to perform this, the synthesis system (87) of the decoder box (8) in FIG. 1/user (18) will read the MPEG file from its hard disk (85) and will send it to a conventional MPEG reader (81). If no complementary data is received by the synthesis system (87), then the MPEG flow which reaches the reader (81) is processed and displayed as it is, which causes a huge distortion of the display on the display screen (6). In effect, the substituted P images which are processed by the synthesis system (87) do not correspond to the P images which are required for a correct viewing because certain P images were replaced by random P images. In contrast, since the recorded flow is definitely an MPEG type flow, the reader (81) does not discriminate and displays the information on the output screen (6) where it gives the appearance of an MPEG video flow but which is totally incoherent for the human being who watches the screen (6). Any copy of the MPEG flow originating from the hard disk (85) of the box (8)/user (18) would produce the same visual effect when it is reconstituted by any MPEG reader; all uses of this copy which would be ill-intentioned are thus doomed to failure.

When the user (18) wants to correctly display on his screen (6) the audiovisual program recorded on his hard disk (85), the user sends a request to the synthesis system (87) with a remote controller as with a VCR or DVD reader presenting a menu on a television screen. The synthesis system (87) then issues a request to the hard disk (85) and commences to analyze the modified MPEG flow originating from the hard disk (85) via the reading buffer (83). The synthesis system (87) then establishes a link with the portal (12) via the telecommunication network (10) which in the example is also the cable network, but which can be a conventional telephone network or a DSL link. Once this link has been established, and during the entire duration of watching the film or audiovisual program, the synthesis system (87) draws out from the buffer memory (123) of the server (12) the substituted P images and the data corresponding to the positions of these P images in relation to the I images of the flow recorded on the hard disk. These P images and these position data are drawn out from the synthesis system (87) via the input buffer memory (86) and are stored temporarily in the volatile memory (88) of the synthesis system (87). From the modified MPEG flow that is drawn out via the buffer (83) and from the P images and the associated data that are drawn out via the buffer (86) in the memory (88), the synthesis system reconstitutes, in reverse manner of the previously described analysis process, the P images substituted by the real P images and sends the thereby reconstituted new MPEG flow to the reader (81) to be displayed correctly on the screen (6). Upon their use, the P images to be substituted and the data associated with these P images are erased from the volatile memory (88).

In the implemented example, before the portal (12) authorized the transmission of the P images and the associated data from its buffer (123), the portal (12) had verified that the user (18) was in fact authorized to receive them. In order to implement this step, the portal (12) reads the information contained on the smart card (82) of the user (18)/box (8) and verifies that the user is in fact authorized to watch this audiovisual program. It is not until this verification has been performed that the P images and the associated data are sent from the buffer (123) to the box user (18)/(8) corresponding to this user.

In the implemented example, the user had made a private copy of his audiovisual program. The synthesis system (87) therefore wrote complementary data on a part (84) of the hard disk (85) as well as the number of the smart card (82) and the information unit "private copy" as data associated with this audiovisual program. Upon the next private reading of this audiovisual program, the synthesis system (87) will analyze these associated data and then inform the portal (12) that the user (18) is implementing a reading of the private copy. If this function is authorized for this user (18) by the portal (12), the P images and the associated data will then be sent by the portal (12) to the buffer (86) as described above. In the contrary case, the data will not be sent and the user (18) will not be able to watch the reconstituted MPEF flow.

We will now describe in detail the different steps for the second user (18).

In this second case, the broadcast network (4) is a satellite network and the telecommunication network (10) is an airwaves system of the local radio loop (LRL) type.

In a manner identical to the description above, the user (18) will receive the MPEG flows and the complementary data from the portal (12). In contrast, before sending the MPEG flow from the output buffer (122), the analysis system (121) will read the incoming MPEG flow (101) and drawing a random number n comprised between 1 and 4, the synthesis system permutes the nth image P which follows each I image of the MPEG flow with the first B image that follows this P image. Each random number used in this manner is recorded in the buffer memory (123) of the portal (12).

During the reconstitution of the MPEG flow by the synthesis system (87) of the decoder box (8), the reading of these random numbers from the portal (12) and the reading of the MPEG flow modified in this manner from the hard disk (85) of the box (8) enables the synthesis system (87) to restore the B and P images in the correct order and send all of it to the reader (81).

The invention claimed is:

1. A method of distributing video sequences in a coded stream including a succession of images each comprising at least one Intra-frame coded image (I picture) and at least one Prediction coded image corresponding to differences between at least two images of the succession of images comprising:
   analyzing an original coded stream prior to transmission to an input/output device of a client and generating, based upon the analysis, a first modified stream and a second stream, wherein said first modified stream includes a modified Prediction coded image, said modified Prediction coded image being a randomly generated image or the result of swapping two Prediction coded images, so that the modification from said at least one Prediction coded image results in a visually altered video sequence, and an I picture, which is not modified, said first modified stream maintaining a form for an encoding system applied to said original coded stream after said modification, and said second stream including digital information that allows a reconstruction from said modified Prediction coded image to said original coded stream;
   separately transmitting the two generated streams from a server to a destination device; and
   synthesizing said first modified stream and said second stream at the destination device to reconstruct said original coded stream.

2. The method according to claim 1, wherein said Prediction coded image is an interframe Prediction coded image and/or a bidirectional Prediction coded image calculated by motion compensation from a previous or subsequent interframe Prediction coded image or the I picture.

3. The method according to claim 1, wherein said second stream includes a pre-modification image that corresponds to the modified Prediction coded image in said first modified stream; and at said destination device, the modified Prediction coded image in said first modified stream is replaced with the corresponding image in said second stream in the synthesis of reconstructing said original coded stream.

4. The method according to claim 1, wherein said modified Prediction coded image is a replacement P picture that is different from, but has the same data volume as, and replaces a first P picture following the I picture.

5. The method according to claim 1, wherein said modified Prediction coded image is a modified Prediction coded image whose modification is done by replacing an n-th interframe Prediction coded image (P picture) following the I picture with a first bidirectional Prediction coded image (B picture) following the P picture.

6. The method according to claim 1, wherein said second stream is distributed via any of a switched telephone network (analog or digital) and a mobile telephone network with GSM, GPRS or UMTS.

7. The method according to claim 1, wherein said first modified stream is a stream that can be decoded by a decoder that is itself based on an MPEG standard or is compliant with an MPEG standard.

8. The method according to claim 1, wherein said coded stream is a stream that is encoded in an MPEG standard or is encoded by a method compliant with an MPEG standard; said Intra-frame coded image is equivalent to I picture in the MPEG standard; and said Prediction coded image is equivalent to P picture or B picture in the MPEG standard.

9. The method according to claim 1, wherein said first modified stream includes a modified P block that constitutes part of the interframe Prediction coded image (P picture).

10. A video-stream generating system that generates a video stream as a coded stream including a succession of frames each comprising at least one Intraframe coded image (I picture) and at least one Prediction coded image corresponding to differences between at least two images of the succession of images, comprising:
    at least one multimedia server which contains original video sequences; and
    an analyzing device that analyzes the video stream originating from an input/output server, said analyzing device detecting said Prediction coded image in said video stream and generating two streams, one of which is a first modified stream and the other of which is a second stream; wherein said first modified stream includes a modified Prediction coded image, said modified Prediction coded image being a randomly generated image or the result of swapping two Prediction coded images, so that the modification from said at least one Prediction coded image results in a visually altered video sequence, and an I picture, which is not modified, said first modified stream maintaining a form for an encoding system applied to said original coded stream after said modification; said second stream including digital information that allows reconstruction from said modified Prediction coded image to said video stream; and said video-stream generating system, in response to a request from a user, separately transmits said first modified stream and said second stream.

11. The system according to claim 10, further comprising a memory that records a "private copy" marker indicating for each user a right to each video content; wherein said right of each user includes a right to watch a private copy of a video content an unlimited number of times, a right to watch the private copy a limited number of times with an indication of the number, or a right prohibiting private copying; said video-stream generating system, in response to a request from a user for privately copying a specific video content, providing said first modified stream to said user; and said video-stream generating system, in response to a request from said user for watching said private copy of the video content, transmitting said second stream to said user after confirming the right to the video content.

12. A video-stream playing device for playing a video stream as a coded stream including a succession of frames each comprising at least one Intra-frame coded image (I picture) and at least one Prediction coded image corresponding to differences between at least two images of the succession of images, comprising:
    a stream decoder which decodes said coded stream;
    at least one recording interface which stores content of a first modified stream including a modified Prediction coded image, said modified Prediction coded image being a randomly generated image or the result of swapping two Prediction coded images, so that the modification from said at least one Prediction coded image results in a visually altered video sequence, and an I picture, which is not modified, said first modified stream maintaining a form for an encoding system applied to said original coded stream after said modification;
    at least one display interface; and
    a synthesizing unit that detects said modified Prediction coded image in said first modified stream and reconstructs the original coded steam from said first modified stream and a second stream that includes the Prediction coded image, which is not modified.

13. The device according to claim 12, wherein said synthesizing unit further comprises a memory device for temporarily storing said second stream; and said second stream stored temporarily in said memory device is deleted after the original coded stream is reconstructed from said second stream and said first modified stream, which is stored in said recording interface.

* * * * *